Patented Aug. 13, 1935

2,011,011

UNITED STATES PATENT OFFICE 2,011,011

PROCESS OF COMBINING ACETYLENE WITH ACETIC ACID

Erich Rabald, Mannheim, Germany, assignor to C. F. Boehringer & Soehne G. m. b. H., Mannheim-Waldhof, Germany No Drawing. Application March 12, 1934, Serial No. 715,245. In Germany March 15, 1933

12 Claims. (Cl. 260—106)

The present invention relates to the production of combinations of acetylene with acetic acid and more especially ethylidene diacetate and vinyl acetate by catalytic action.

The reaction underlying the production of ethylidene diacetate and vinyl acetate by catalytic combination of acetylene with acetic acid was described in principle in the specification of U. S. Patent 1,084,581. Since the issue of this patent many other methods have been suggested for carrying through this important reaction with greater success, however, all these suggestions involved certain disadvantages of a technical or economical character and did not allow a suitable suppression of the resinification peculiar to this reaction. The most successful of these propositions appears to be the method disclosed in the specification of U. S. Patent 1,855,366, this method making use of a mercury catalyst prepared with the aid of sulfuric acid anhydride.

It is an object of my invention to provide means for carrying out the same reaction with equal success as regards yield and suppression of an undesirable resinification, however making use of catalysts, the preparation and handling of which does not require special apparatus and does not endanger the operators as does $SO_3$.

According to this invention I produce ethylidene diacetate and vinyl acetate from acetic acid and acetylene in the presence of a mercury salt of the methionic acid (methane disulfoacid) or of some other organic disulfoacid, taking care that free disulfoacid be present in excess of that required to form the mercury salt.

I am aware that it is old to produce ethylidene diacetate from acetic acid and acetylene in the presence of a mercury sulfonate. I have however found, that materially better yields are obtained or, with equal yield, less resinification occurs and the quantity of the mercury salt can be very materially reduced, if in addition to the mercury sulfonate or instead of an excess of mercuric oxide above the sulfoacid, an excess of free disulfoacid is present. In contradistinction to the disulfoacids the monosulfoacids, including also those enumerated in the specification of U. S. Patent 1,306,964, even if present in excess, yield very unsatisfactory results. Aldehyde disulfoacids give equally unsatisfactory yields.

For instance if in accordance with the method disclosed in the specification of U. S. Patent 1,306,964 acetylene gas is introduced into 1000 parts by weight glacial acetic acid in the presence of 40 parts mercuric oxide, and 26 parts sulfoacetic acid, there is obtained a mixture of ethylidene diacetate and vinyl acetate amounting to 85 to 90% of the calculated quantity, and further about 50 parts of a resin. If the quantity of catalyst present is reduced to 6.5 parts mercuric oxide and 4.3 parts sulfoacetic acid, the yield is only 8 to 10%. If a mercury methionate obtained by reacting with 40 parts mercuric oxide on the equivalent quantity of methionic acid is used as catalyst, about 70% ethylidene diacetate and about 280 parts resin are obtained.

In contradistinction thereto, if according to the present invention free methionic acid is present in excess of the quantity corresponding to the mercuric oxide, for instance 6.5 parts mercuric oxide and 17.5 parts methionic acid of 69%, a yield of 85 to 90% pure ethylidene diacetate and only about 30 parts resin are obtained.

As compared with the operation in the absence of free disulfoacid the method according to the present invention offers the further advantage that the absorption of the acetylene requires only about one half of the time.

I have found that the production of ethylidene diacetate is preferably carried through at a temperature ranging between 60 and 100° C., while vinyl acetate is preferably produced, under otherwise similar conditions, at about 30 to 45° C.

In practising my invention I may for instance proceed as follows:—

Example 1

To 2 kgs. glacial acetic acid placed in a vessel provided with an agitator 13 grams mercuric oxide are added at a temperature of 85° C. After the mercuric oxide has dissolved, 24 grams methionic acid (corresponding to 35 grams of a 69% acid) are added and at a temperature of 75 to 80° C. acetylene is introduced under stirring until no further gas is absorbed. After neutralization of the methionic acid with sodium acetate the product of reaction is subjected to distillation and purification. I thus obtain 1984 grams ethylidene diacetate which correspond to a yield of 93%, calculated on the acetylene which entered into reaction.

Example 2

When proceeding as described with reference to Example 1, however adding 30 grams mercuric oxide and 50 grams benzene disulfoacid, there is formed at 80 to 100° C. a quantity of ethylidene diacetate corresponding to a yield of 88 to 93% calculated on the acetylene used in the reaction, besides 20 grams of a resin.

If the benzene disulfoacid used according to

Example 2 is replaced by 60 grams naphthalene disulfoacid or by 68 grams cresol disulfoacid or by 50 grams benzoic disulfoacid, the yields, calculated on acetylene entered into the reaction, is 90 to 100% and 70 to 75% and 88 to 93%, respectively, 20 and 40 and 20 grams resin being formed, respectively.

Example 3

Into a solution formed according to Example 1 from 2 kgs. glacial acetic acid, 20 grams mercuric oxide and 24 grams methionic acid, acetylene is introduced under vigorous stirring at 35 to 40° C. until no more of the gas is absorbed. The further treatment occurs as described with reference to Example 1 and there are obtained 1220 grams vinyl acetate corresponding to a yield of about 71%, calculated on reacted acetylene.

In this reaction the catalysts enumerated in Example 2 may be used also with the same effect.

Various changes may be made in the details disclosed in the foregoing specification without departing from the invention or sacrificing the advantages thereof.

I claim:—

1. The method of combining acetylene with acetic acid for the production of ethylidene diacetate and vinyl acetate, comprising reacting acetylene with an acetic acid compound in the presence of a mercury sulfonate and a free organic disulfoacid.

2. The method of combining acetylene with acetic acid for the production of ethylidene diacetate and vinyl acetate, comprising reacting acetylene with an acetic acid compound in the presence of a mercury sulfonate and free methionic acid.

3. The method of combining acetylene with acetic acid for the production of ethylidene diacetate and vinyl acetate, comprising reacting acetylene with an acetic acid compound in the presence of mercury methionate and free methionic acid.

4. The method of combining acetylene with acetic acid for the production of ethylidene diacetate and vinyl acetate, comprising reacting acetylene with an acetic acid compound in the presence of mercuric oxide and an organic disulfoacid in excess of that necessary to completely combine with the mercuric oxide.

5. The method of combining acetylene with acetic acid for the production of ethylidene diacetate and vinyl acetate, comprising reacting acetylene with an acetic acid compound in the presence of mercuric oxide and a quantity of benzoic disulfoacid exceeding the quantity necessary to completely combine with the mercuric oxide.

6. The method of combining acetylene with acetic acid for the production of ethylidene diacetate and vinyl acetate, comprising reacting at a temperature above normal acetylene with an acetic acid compound in the presence of a mercury sulfonate and a free organic disulfoacid.

7. The method of combining acetylene with acetic acid for the production of ethylidene diacetate, comprising reacting at a temperature between 60 and 100° C. acetylene with an acetic acid compound in the presence of a mercury sulfonate and a free organic disulfoacid.

8. The method of combining acetylene with acetic acid for the production of vinyl acetate, comprising reacting at a temperature between 34 and 45° C. acetylene with an acetic acid compound in the presence of a mercury sulfonate and a free organic disulfoacid.

9. The method of producing ethylidene diacetate comprising reacting at about 85° C., 2 kgs. glacial acetic acid in the presence of 13 grams mercuric oxide and 35 grams methionic acid of 69% with acetylene, neutralizing the acid and distilling the product.

10. The method of producing vinyl acetate comprising reacting at about 35 to 40° C. 2 kgs. glacial acetic acid in the presence of 20 grams mercuric oxide and 24 grams methionic acid with acetylene and subjecting the product to distillation.

11. The method of combining acetylene with acetic acid for the production of ethylidene diacetate and vinylacetate, comprising reacting acetylene with an acetic acid compound in the presence of a mercury sulfonate and a free aromatic disulfoacid.

12. The method of combining acetylene with acetic acid for the production of ethylidene diacetate and vinylacetate, comprising reacting acetylene with an acetic acid compound in the presence of a mercury sulfonate and free naphthalene disulfoacid.

ERICH RABALD.